US006542490B1

(12) United States Patent
Ahmadvand et al.

(10) Patent No.: US 6,542,490 B1
(45) Date of Patent: Apr. 1, 2003

(54) DATA LINK CONTROL PROCTOCOL FOR 3G WIRELESS SYSTEM

(75) Inventors: Nima Ahmadvand, Ottawa (CA); Mo-Han Fong, Verdun (CA); Geng Wu, Verdun (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/239,545

(22) Filed: Jan. 29, 1999

(51) Int. Cl.[7] .................................................. H04J 3/24
(52) U.S. Cl. ...................... 370/338; 370/469; 714/712
(58) Field of Search ................................ 370/328, 329, 370/338, 401, 465, 466, 349, 469, 475

(56) References Cited

U.S. PATENT DOCUMENTS

| | | | |
|---|---|---|---|
| 5,629,948 A | | 5/1997 | Hagiwara et al. |
| 5,638,371 A | * | 6/1997 | Raychaudhuri et al. ..... 370/347 |
| 5,684,791 A | * | 11/1997 | Raychaudhuri et al. ..... 370/278 |
| 5,715,257 A | | 2/1998 | Matsuki et al. |
| 5,726,764 A | | 3/1998 | Averbuch et al. |
| 5,793,744 A | * | 8/1998 | Kanerva et al. ............. 370/209 |
| 6,310,890 B1 | * | 10/2001 | Choi ........................... 370/469 |
| 6,477,670 B1 | * | 11/2002 | Ahmadvand ................ 714/712 |

FOREIGN PATENT DOCUMENTS

WO    WO 97/00568    1/1997    ........... H04L/12/28

OTHER PUBLICATIONS

TIA/EIA/IS–707A, "Data Service Option Standard for Spread Spectrum Digital Cellular Systems (Ballot version)," Nov. 1998.

TIA/EIA/IS–95B, "Mobile Station–Base Station Compatibility Standard for Dual–Mode Wideband Spread Spectrum Cellular Systems," Oct. 31, 1998.

TIA TR–45.5, "The cdma2000 RTT Candidate Submission," Jun. 2, 1998.

ITU IMT–2000, "International Mobile Telecommunications—2000".

* cited by examiner

*Primary Examiner*—Douglas Olms
*Assistant Examiner*—Alexander Boakye (57) ABSTRACT

A Data Link Control protocol for 3G wireless communication system for direct support for network layer protocols, e.g. the Internet Protocol (IP), is provided. The Link Layer disclosed comprises a Link Access Control (LAC) sublayer and a Medium Access Control (MAC) sublayer. At a transmit end of the wireless system, a plurality of Quality of Service (QoS) data planes are created to directly support the IP QoS. Each QoS data plane is optimized to handle QoS requirements for a corresponding Class of Service (CoS). Data packets received at the LAC sublayer are directed to a QoS data plane according to the particular QoS information they contain and processed according to the particular QoS requirement to generate variable size LAC frames. The variable size LAC frames are transmitted to the MAC sublayer for generating radio link protocol data units (RLP PDUs) to be transmitted to a receiving end. A new level of error correction is provided at the LAC sublayer as the size of the LAC PDUs can be dynamically adjusted in response to the conditions of the communication link. A dual mode ARQ is provided at the MAC sublayer to improve the quality of the air transmission for bursty as well as non-bursty traffic conditions.

31 Claims, 4 Drawing Sheets

DATA LINK CONTROL PROCTOCOL FOR 3G WIRELESS SYSTEM

BACKGROUND OF THE INVENTION

1. Field of the Invention

The present invention relates generally to link layer protocols, and more particularly to a data link protocol for third generation (3G) wireless systems for direct support of network layer protocol data services, i.e. the Internet Protocol (IP).

2. Description of the Related Art

Layered architecture is a form of hierarchical modularity used in data network design. All major emerging communication network technologies rest on the layers of the International Organization for Standardization (ISO/OSI) model, illustrated in FIG. 1A. A layer performs a category of functions or services. The OSI model defines a Physical Layer (Layer 1) which specifies the standards for the transmission medium, a Data Link Layer (Layer 2), a Network Layer (Layer 3), a Transport Layer (Layer 4) and Application Layers (Layers 5 to 7).

Data link layer protocols are used to mitigate the effects of impairments introduced by the physical transmission medium. A Radio Link Protocol (RLP) is designed for the wireless system to deal specifically with the types of impairments found on the radio link and comprises mechanisms to deal with errors on the communications link, delays encountered in transmitting information, lost information, bandwidth conservation, and contention resolution.

The third layer is the Network Layer which implements routing and flow control for the network.

The fourth layer, Transport Layer, provides reliable and transparent transfer of data between end points. It provides end-to-end error recovery and flow control. For the Internet based protocol model, the Transport Control Protocol (TCP) mainly corresponds to the Transport Layer of the OSI model.

Figure 2:
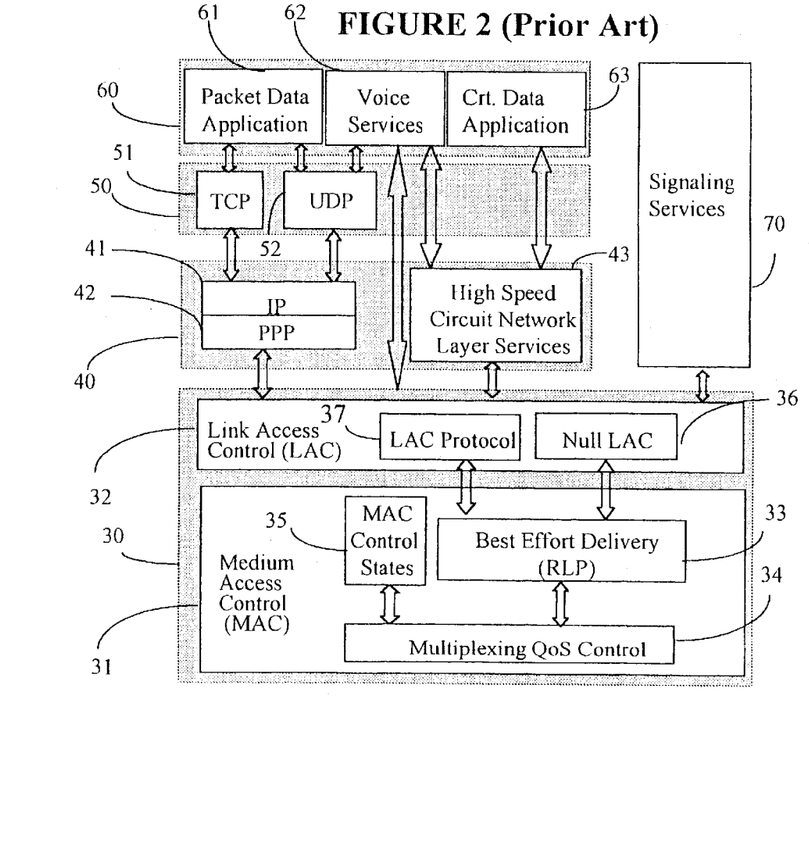
FIG. 2 shows the OSI layers for a wireless communication system according to the proposed TIA TR-45.5.

FIG. 2 shows the OSI Data Link Protocol architecture layer proposed for a 3G wireless network, and more particularly for a code division multiple access, i.e. "The cdma2000 RTT Candidate Submission", Jun. 2, 1998 (TIA TR-45.5) network. At the most basic level, the TIA TR-45.5 layer structure provides protocols and services that correspond to the bottom two layers Layer 1—the physical layer 20 and Layer 2—the Data Link Layer (DLC) 30 of the OSI architecture, according to the general structure specified by the "International Mobile Telecommunications-2000" (ITU IMT-2000).

Layer-1, i.e. the Physical Layer 20 is responsible for coding and modulation of data transmitted over the air, and is not shown in FIG. 2 for simplification.

Layer-2, i.e. the Link Layer 30 is subdivided into the Link Access Control (LAC) sublayer 32 and the Medium Access Control (MAC) sublayer 31. The separation in MAC and LAC sublayers is motivated by the need to support a wide range of upper layer services, and the requirement to provide for high efficiency and low latency data services over a wide performance range (from 1.2 Kbps to greater than 2 Mbps). Other motivators are the need for supporting high QoS delivery of circuit and packet data services, such as limitations on acceptable delays and/or data BER (bit error rate), and the growing demand for advanced multimedia services each service having a different QoS requirements.

LAC sublayer 32 is required to provide a reliable, in-sequence delivery transmission control function over a point-to-point radio transmission link 42.

The MAC sublayer 31 includes procedures 35 for controlling the access of data services (packet and circuit) to the Physical Layer 20, including the contention control between multiple services from a single user, as well as between users in the wireless system. The MAC sublayer 31 services include a best effort delivery RLP 33, which provides for a reasonably reliable transmission over the radio link layer, using a Radio Link Protocol (RLP) that provides a "best effort" level of reliability. Multiplexing and QoS (quality of service) control 34 is responsible for enforcement of negotiated QoS levels by mediating conflicting requests from competing services and the appropriate prioritization of access requests. MAC Control States, block 35, and QoS control side of block 34, are again specific to the TIA TR-45.5 system.

The MAC is divided into two sections namely a physical layer independent convergence function (PLICF) section, and a physical layer dependent convergence function (PLDCF) section. A state machine running in the PLICF section regulates the delivery of the LAC PDU's to the Radio Link Protocol (RLP) which is mainly located in the PLDCF. The PLDCF also contains a multiplexing and QoS control module which multiplexes the RLP frames onto different physical channels based on their QoS requirements. Again, the wireless data link layer may be viewed as an interface between the upper layers and the wireless Physical Layer.

As illustrated in FIG. 2 in the Transport Layer 50 are the Transport Control Protocol (TCP) 51 and the User Datagram Protocol (UDP) 52. A Hyper Text Transport Protocol (HTTP), a Real-time Transport Protocol (RTP), or other protocols may also be present.

The upper layers 5 to 7, denoted in this figure with 60, include the session, presentation and application layers for packet data applications 61, voice services 62, simple circuit data applications (e.g. asynchronous fax) 63, and simultaneous voice and packet data service. Voice services 62 may utilize directly the services provided by the TIA TR-45.5 LAC services. Signaling services 70 are illustrated over layers 40, 50 and 60, to indicate that the signaling information is exchanged between all layers 3–7 and the DLC layer.

Current wireless networks use layer 2–4 protocols designed specifically for the wired networks. However, there are some major differences between the wireless and wired environment, resulting in important differences in the way these networks operate.

In a wired network the bit error rates are typically on the order of $10^{-9}$ or better, and errors and packet loss have a tendency to be random. Therefore, the wired transmission medium could be considered essentially error-free and the TCP data packets are lost mainly due to congestion in the intervening routers. Moreover, in a wired system the transmission channel has a constant bandwidth and is symmetrical, which means the characteristics of the channel in one direction can be deduced by looking at the characteristics of the channel in the other direction. Therefore, it is often easiest to use a common link control protocol and to solve congestion problems by adding bandwidth.

On the other hand, in a wireless environment, most of these assumptions are no longer valid. The wireless channel is characterized by a high bit error rate. The errors occur in bursts that can affect a number of successive packets. Due to fading, the low transmission power available to the Mobile Station (MS) and the effects of interference, the radio link is not symmetrical and the bandwidth of the channel rapidly fluctuates over time.

Furthermore, in a wireless environment, the amount of bandwidth available to the system is fixed and scarce. Adding bandwidth to the radio link may be expensive or even impossible due to regulatory constraints.

In addition, the issues in connection with increasing the transmission bandwidth are substantially different in the wireless environment. In a wired environment increasing the throughput is simply a matter of allocating as much bandwidth as possible to the connection. In a wireless environment, part of the bandwidth is used in error correction. More error correction means less payload. However, more error correction increases the probability of correct delivery without retransmissions. Thus, in the wireless environment increasing the end-to-end throughput may be obtained by reducing bandwidth assigned to payload and using the freed bandwidth for error correction.

The Data Link Control (DLC) protocols available to date do not attempt to be inclusive as complete DLC protocols. Basically, off-the-shelf protocols intended for different media have been adopted for wireless systems. Even though some of those protocols are standardized, they are not very efficient for the wireless system. Also, some of the interactions between the non-wireless protocols and the communication system have caused a lot of complexities. For example, a point to point protocol (PPP) is currently used to conduct part of the functionality needed for the DLC layer. However, such a protocol imposes new limitations over the communication system. Moreover, for the DLC protocol to support the IP quality of service (QoS), the PPP encapsulation must be undone which lowers the throughput.

Also, the Layer-2 ARQ protocol as defined in the current CDMA standard "Data Service Option Standard for Spread Spectrum Digital Cellular Systems", Ballot version, November 1998 (TIA/EIA/IS-707A), is a RLP which consists only of a Selective-Repeat (SR) scheme. TIA/EIA/IS-707A RLP uses the SR scheme for all classes of traffic. The latency introduced by the initialization procedures of this protocol is unnecessary and inefficient for traffic profile with short and infrequent data bursts. Furthermore, the existent RLP protocol is a "best effort" type protocol, which tries to retransmit the frames received in error for a number of times and then gives up after a certain number of attempts.

Accordingly, there is a need for a specialized DLC protocol for the 3G wireless systems which can satisfy the demand for advanced multimedia services to support multiple concurrent voice, packet data, and circuit data services, each having various QoS requirements.

Also, there is a need to improve the existing ARQ protocols to satisfy different QoS requirements.

SUMMARY OF THE INVENTION

It is an object of the present invention to provide a Data Link Control(DLC) protocol which supports the Internet Protocol (IP) in a wireless communication system and to alleviate totally or in part the drawbacks of the prior art. This novel DLC removes the need for non-wireless data link protocols with their inherent limitations imposed. Furthermore, the DLC protocol according to the invention is capable of interfacing with the existing non-wireless Data Link Protocols.

It is another object of the present invention to provide a DLC protocol for a wireless communication system, which supports IP Quality of Service (IPQoS) requirements for various advanced multimedia services.

Still another object of the invention is to provide improved multi-mode Layer 2 Automatic Repeat Request (ARQ) protocol for a wireless system.

According to one aspect of the invention a Data Link Control (DLC) protocol for direct support of a network layer protocol is provided. At a transmit end of a wireless communication system, the DLC protocol of the invention uses a plurality of QoS data planes for processing the received data packets according to a particular QoS requirement and to generate radio link protocol data units (RLP PDUS) to be transmitted to a receiving end. According to the information in a received network layer data packet, a QoS processing module converts the received data packets into QoS oriented data packets and redirects the QoS oriented data packets to the appropriate QoS data plane. A new level of error recovery is created at the Link Access Control (LAC) as the RLP PDUs have variable length which is dynamically adjusted in response to the conditions of the communication link. An improved dual mode ARQ is also provided at the Medium Access Control (MAC) for improving the quality of the air transmission especially when the traffic profile of the service includes data bursts with large inter-arrival time.

According to another aspect of the invention, a method for processing network layer protocol data packets for transmission over a wireless communication system is provided. A plurality of QoS data planes are created at the Data Link Layer level of the wireless communication system for processing the data packets received from the network layers according to a Class of Service (CoS), and to generate RLP PDUs to be transmitted over the Physical Layer. The method comprises the steps of converting the received network layer protocol data packets into QoS oriented data packets according to the information contained in the received data packets; directing the QoS oriented data packets to an appropriate QoS data plane, each QoS data plane having its dedicated LAC and MAC instances; at the LAC level, dividing the QoS oriented data packets in smaller size sequence frames and encapsulating a plurality of sequence frames to form HDLC-like LAC frames; at the MAC level, receiving the LAC frames and regulating their delivery to the radio link protocols (RLPs) and converting the LAC frames into protocol data units (RLP PDUs).

Advantageously, the DLC protocol according to the invention, enables direct support of the IP networking and IP Quality of Service (IP QoS)in the wireless system by introducing QoS data planes to handle different Classes of Service (CoS) defined at the DLC layer. It also introduces a new level of error recovery, i.e. an Automatic Repeat Request (ARQ) at the Link Access Control (LAC) sublayer to insure better connectivity and prevent propagation of errors to higher layers. This functionality enables less delays and better flow control.

The DLC protocol according to the present invention removes the need for other non-wireless data link protocols, such as PPP, to connect to the IP. In addition, the MAC disclosed in conjunction with the DLC protocol of the invention introduces a multi-mode RLP which supports different QoS requirements, particularly for bursty as well as non-bursty traffic conditions.

Other aspects and features of the present invention will become apparent to those skilled in the art upon review of the following description of specific embodiments of the invention in conjunction with the accompanying figures.

DETAILED DISCLOSURE OF THE EMBODIMENTS

Throughout the description the term "Quality of Service" (QoS) refers to network layer protocol QoS which includes "best effort", "expedited delivery", and "assured delivery". A Class of Service (CoS) defined at the DLC layer includes a set of services that have substantially the same QoS requirements.

Figure 1A:
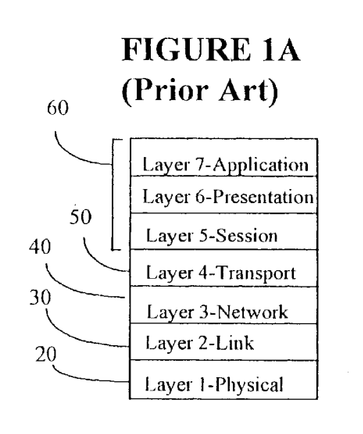
FIG. 1A shows the OSI layers in general.

FIG. 1A shows the International Organization for Standardization (ISO/OSI) reference model in general, and was described above. The layers are denoted with 20 (not shown), 30, 40, 50 and 60.

Figure 1B:
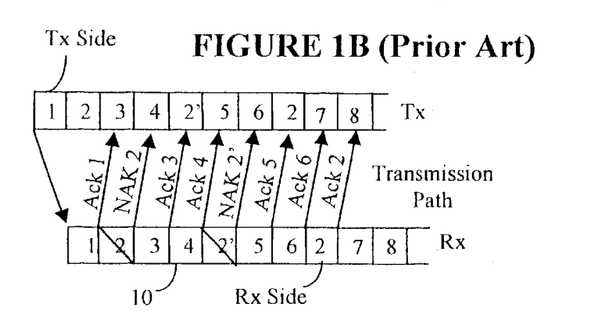
FIG. 1B is a sequential timing chart for the transmission operation according to a conventional ARQ protocol.
Figure 1C:
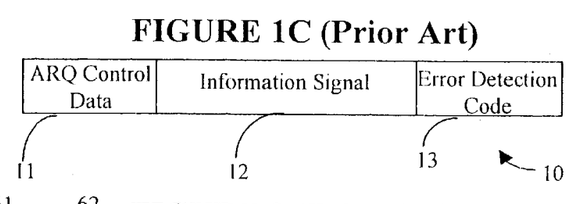
FIG. 1C is a transmission frame structure according to the conventional ARQ protocol.

FIG. 1B shows a typical data transmission, using Automatic Repeat Request (ARQ), and FIG. 1C shows a transmission frame structure for a conventional ARQ system. FIG. 1B illustrates a transmitter Tx on the transmitting side of a wireless transmission system, a receiver Rx on the receiving side, and the transmission path. The transmission path is a wireless transmission channel established between the transmitting and receiving sides.

The ARQ frame 10 of FIG. 1C comprises client information, denoted "information signal" 12, which is the data to be transmitted. An error detection code 13, such as a Cyclic Redundancy Checking (CRC) code is attached to the transmission data 12 by the ARQ transmitter Tx. At the ARQ receiver Rx, each frame 10 of the received signal is checked for errors using field 13, and Rx sends a re-transmission request signal back to Tx whenever an error is detected. In the case the frame is received without errors, Rx extracts the information signal 12 from frame 10 and the client information is delivered to the respective terminal.

Field 11 denotes "ARQ control data" in frame 10 indicates to Tx if the data have arrived at Rx with or without errors, and also identifies which frame has to be retransmitted. FIG. 1B illustrates transmission of eight consecutive frames, frame 1 to frame 8. In this example, frame 1 is received correctly by Rx, which sends Ack #1 (Acknowledgment, frame #1) to Tx. On the other hand, frame 2 is received with errors, and Rx sends NAK #2 (Negative Acknowledgment, frame #2) to Tx, which indicates that frame 2 must be retransmitted. In response to this NAK #2 signal, Tx retransmits frame 2, denoted with 2' on FIG. 1B. Nak #2 is received during transmission of frame 4 so that the second frame 2' is retransmitted immediately after frame 4 and before frame 5. If frame 2' is again received in error, retransmission is requested again, in response to the NAK #2' signal, until frame 2 is received without errors, as indicated to Tx by Ack #2 signal.

Current second generation (2G) wireless systems are designed mostly to handle voice traffic, with some allowances for circuit-switched data. Later, packet data services were grafted onto the 2G systems but these are uniformly treated according to "best effort delivery" schemes. The type of RLP used in 2G systems is typically based on the generic service(s) available to the MS (Mobile Station), as for example voice services, packet data services, and/or circuit switched data services. The voice service may use a transparent RLP which does not provide error detection. The packet data service may use a non-transparent RLP which provides error detection and retransmissions. The circuit switched data service may use either a transparent or a non-transparent RLP.

Enhancements to the existing 2G wireless systems are currently under way, motivated by higher bandwidth and the need to handle a wider variety of services. Proposed standard TIA TR-45.5 supports a fully generalized multi-media service model, which allows virtually any combination of voice, packet data, and high speed circuit data services to operate concurrently. The TIA TR-45.5 will include a sophisticated Quality of Service (QoS) control mechanism to balance the varying QoS requirements of multiple concurrent Classes of Service (CoS).

Non-wireless Data Link Layer protocols(e.g. PPP), Network Layer protocols (e.g.IP), Transport Layer protocols (e.g. TCP), and the Application Layers are considered as "upper layer protocols" in the wireless protocol stack architecture, shown in FIG. 1A.

In the third generation (3G) wireless communication systems, the Internet Protocol (IP) is selected as the preferred network layer protocol 41.

The IP packets (e.g. versions 4 and 6) include the IP Quality of Service (IPQoS) information. There are two main trends in the industry to support the IP QoS. The first method uses an end-to-end flow control. This method is called the Integrated Services (Int-Serv), and it uses a ReSerVation setup Protocol (RSVP) to pass the QoS request from the end system to each intermediate router along the data path. An admission control algorithm at each router along the path verifies the resources needed to provide the requested QoS. A policy control unit performs the administration. The Int-Serv approach results in lowering the throughput and it is somewhat complicated and not easily scalable. In the second method, the complexity is moved to the edges of the network, keeping the core simple. This scheme is named Differentiated Services (Diff-Serv). The traffic conditioning is done in a per-hop basis. The Diff-Serv method is preferred as it is easy to implement and scalable.

The Data Link Layer protocols proposed to date for the TIA TR-45.5 do not support IP 41 directly and therefore, other protocols such as PPP 42 are used, as shown in FIG. 2. Obviously, these protocols impose additional restrictions on the wireless system in general.

Figure 3:
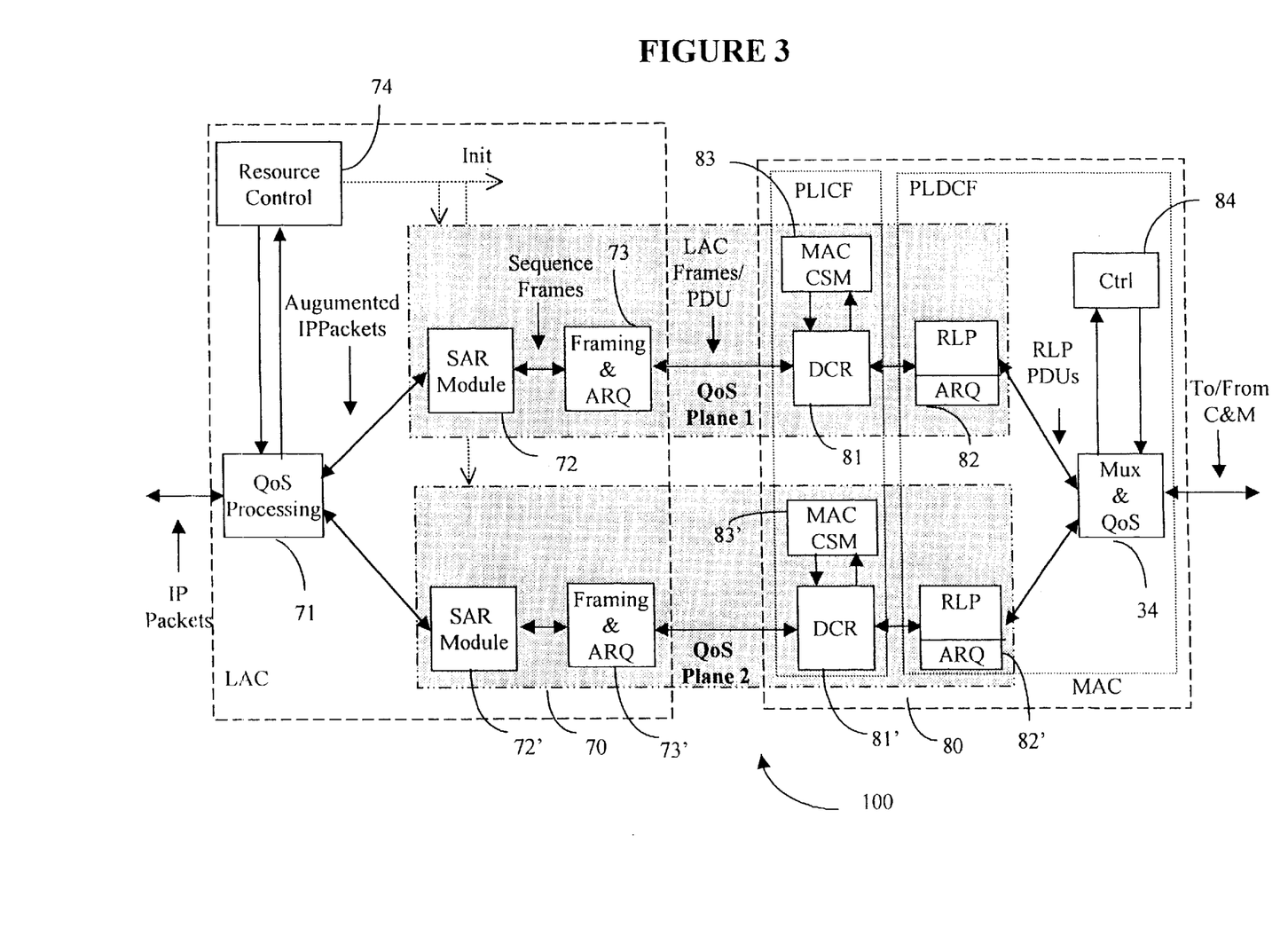
FIG. 3 is a block diagram of the DLC protocol according to the invention.

FIG. 3 shows the structure of the DLC layer 100 according to the invention, which is designed to support IP networking without adding any limitations that are not related to the wireless systems. The new DLC layer 100 design according to the invention may be viewed as an interface between the IP layer 41 and the Physical Layer 20 (not shown), and can accommodate a variety of Classes of Service (CoS) having different Quality of Service (QoS) requirements. It follows that the layers proposed in the ITU IMT-2000, i.e. the DLC layer functionality is divided into LAC sublayer 70, and MAC sublayer 80 which in turn includes the PLDCF and the PLICF sections.

The DLC protocol 100 according to the invention is shown in FIG. 3 and includes direct support for the IP protocol 41 and isolates the logical operation of the network from the Physical Layer 20 (not shown). As indicated above, the IP packets include the IP Quality of Service (IPQoS) information. The DLC layer 100 has a scheme to map the IPQoS requirements to DLC Classes of Service (CoS). Each CoS is separated inside the DLC protocol layer 100 and directed to a specific QoS data plane.

FIG. 3 shows the structure of an enhanced DLC protocol architecture 100 according to the invention, for two QoS data planes, namely QoS data plane 1 and QoS data plane 2, separated by a dotted line. It is however to be understood that the invention is no limited to two QoS data planes, and that more planes may run simultaneously in the DLC layer 30. Each QoS data plane is optimized to handle the QoS requirements of the corresponding CoS.

Figure 4:
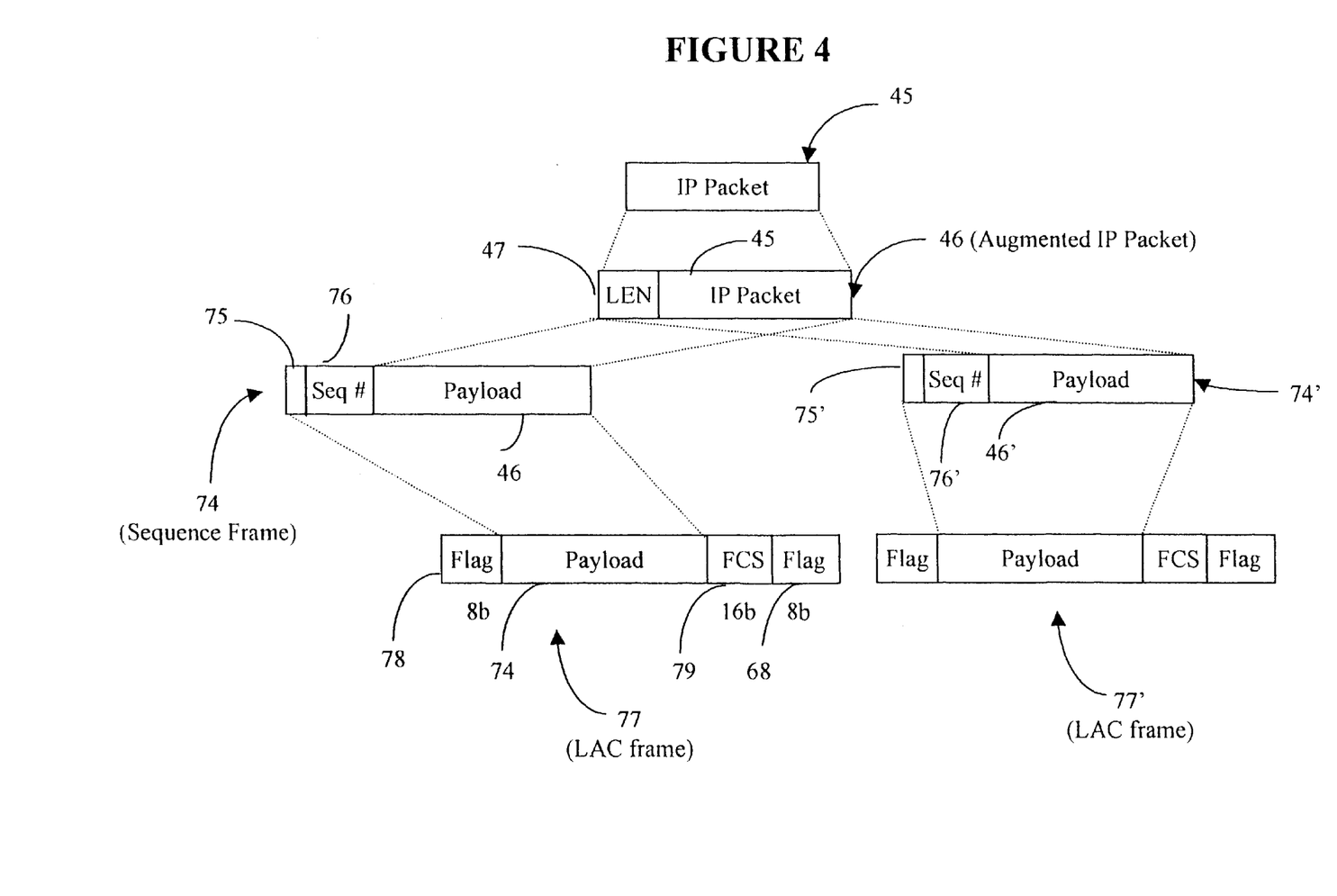
FIG. 4 illustrates the mapping of the IP packets to RLP PDUs (frames) according to the invention.

FIG. 4 illustrates how the data is processed in the DLC protocol layer 100 and is described together with FIG. 3.

A QoS processing module 71 of the LAC layer 70 is responsible for receiving the IP packets and extracting the IP QoS requirements included in the IP packets. IP QoS requirements are translated into QoS classes of service. The QoS processing module 71 also initiates a QoS data plane for each cos through a Resource Control (RC) unit 74. Each QoS data plane include dedicated LAC and MAC instances.

An IP packet received by the QoS processing module 71 directly from IP block 41 of network layer 40 (shown in FIG. 2), is denoted with 45. An optional length (LEN) indicator 47 is added to each packet 45 by the QoS processing module 71. The length indicator 47 is added to enable reconstruction of the original IP packet 45 by a Segmentation and Reassembly (SAR) module (not shown) at the receiving side. Similarly, the length indicator of the IP header can be used. In this case, the LEN indicator is not needed. The resulting packet 46 is called an "augmented IP packet".

Furthermore, based on the QoS classification obtained, QoS processing module 71 redirects the IP packets 45 to the proper QoS data plane. Packets without IP QoS classification are defaulted to a "best effort" QoS data plane. It should be noted that any network layer protocol other than the IP may be supported by including the corresponding functionality in the QoS processing module 71. There is at least one QoS processing module (not shown) for each Mobile Station (MS). Moreover, the receiving and the transmitting sides comprise identical QoS data planes.

A Segmentation and Reassembly (SAR) modules 72, 72' is provided in each QoS plane. For example, SAR 72 is provided in QoS data plane 1, and SAR 72' is provided in QoS data plane 2. In this example, SARs 72 and 72' receive the redirected and augmented IP packets 46, or QoS oriented data packets having same Quality of Service (QoS) requirements.

SAR module 72 or 72' chops the augmented IP packet 46 to smaller size packets, which are more suitable for error recovery and retransmission. These smaller size packets are defined as "sequence frames", denoted with 74, 74', on FIG. 4. The size of a sequence frame is variable and dynamically optimized for different QoS data planes based on the QoS requirements and the radio link conditions.

A start of message (SOM) bit field 75 and a sequence number field 76 are then added to the payload 46. A logic "1" for example in SOM bit 75 could be used to identify the start of a sequence frame 74, while the sequence number is necessary in the retransmissions of unsuccessful frames.

As a result, a number of smaller same Class of Service (CoS) sequence frames 74, 74', are presented by a respective SAR module 72, 72', to a Framing and Automatic Repeat Request (ARQ) module 73, 73'. A new level of error recovery (i.e.ARQ) is created at the LAC level to provide better connectivity and to prevent propagation of errors to higher levels. The sequence frames are then encapsulated in High-level Data Link Control (HDLC)-like frames 77, 77', in a respective Framing and ARQ module 73, 73'.

HDLC-like framing is used to separate individual sequence frames by means of "bit stuffing" operation within the payload and encapsulating by start and end flags. A 16 bit Frame Check Sequence (FCS) is included for error detection and is used for ARQ protocols. The HDLC-like framing applied here does not use the address and control fields of the generic HDLC frames. The HDLC-like frames serve as LAC Protocol Data Units (LAC-PDUs), or LAC frames, as indicated on FIG. 4. The maximum size of a LAC frame 77 is defaulted to be the same as the one for PPP, which is 1500 bytes. This maximum value is negotiable.

As discussed above, the sequence frame 74, 74', has variable length which can be dynamically adjusted by the transmitting side, based on the radio link conditions. This results in variable length LAC-PDUs.

The radio link conditions can be monitored in the following ways. If there are many negative acknowledgments (NAKs) from the receiving side, or for a predetermined period of time no acknowledgment is received, then the LAC-PDU size could be lowered to enhance the error correction and the overall throughput. No negotiations take place between the transmitting and the receiving LAC instances and therefore, there is no need for over the air signaling.

The LAC-PDUs 77 are then delivered to the MAC instance 80 in the same QoS data plane. The point-to-point link connectivity of each QoS data plane is maintained by peer LAC instances at the transmitting and the receiving sides.

According to the invention, the IP layer 41 can sit on top of the new DLC layer 100 and the DLC protocol provides direct support for any network layer protocol with no need for any other protocol as an interface. This greatly reduces the limitations imposed by other protocols, which are not designed for the wireless systems.

Within each QoS plane, MAC sublayer 80 comprises the PLICF and PLDCF sections, as per TIA TR-45.5. A Dedicated/Common Router (DCR) 81 or 81', is controlled by the MAC Control State Machine (MAC CSM) 83, 83' to route LAC-PDUs to be carried over a dedicated or a common radio traffic channel. When a dedicated radio traffic channel is used, the PLDCF section includes a dedicated Radio Link Protocol (RLP) 82 or 82', as defined in TIA TR-45.5. The RLP 82 or 82', treats the incoming traffic from the DCR 81, or 81' as a byte stream and encapsulates the LAC-PDUs into 20 ms RLP-PDUs.

For the non-transparent RLP (as defined in the TIA TR-45.5 and the TIA/EIA/IS-707A), ARQ function is also provided at the MAC level. The RLP-PDUs which are received with errors will be retransmitted. The functions of the peer RLPs at the receiving side include the re-sequencing of the received PDUs to insure in-order-delivery to the MS/LAC sublayer. The RLPs used are designed for different classes of service (CoS). This adds another level of error correction and flexibility for optimizing a QoS data plane for a specific CoS.

The present invention also provides an improved ARQ protocol at the MAC level with two modes of operations: a normal-mode (NM) and a burst-mode (BM). When in normal-mode, a Selective Repeat (SR) ARQ scheme is used. In burst-mode, a Stop-and-Wait (SW) ARQ scheme is used. Depending on the CoS or the QoS requirements, the ARQ protocol chooses to use either one of the SR or SW schemes.

The SR scheme provides highest throughput efficiency since the transmitter transmits frames continuously and only the corrupted frames are retransmitted. However, to operate in SR mode, an initialization handshake procedure is needed so that peer ARQ protocol entities are initialized, i.e. the frame sequence number is reset to zero, and the retransmissions buffer is cleared. The latency and bandwidth overhead introduced by the initialization procedures are undesirable if, for example, the traffic profile of the service consists of short data bursts with large inter-arrival time and consequently, the peer RLP entities need to be re-initialized after each idle period.

The SW scheme is used for short and infrequent data bursts. For the SW scheme, the transmitter stops and waits for acknowledgment from the receiver before sending out the next PDU. There is no need to synchronize the state between peer ARQ protocol entities. Therefore, when the SW scheme is used, no initialization procedures are needed as in the SR case, which reduces the associated latency.

Figure 5:
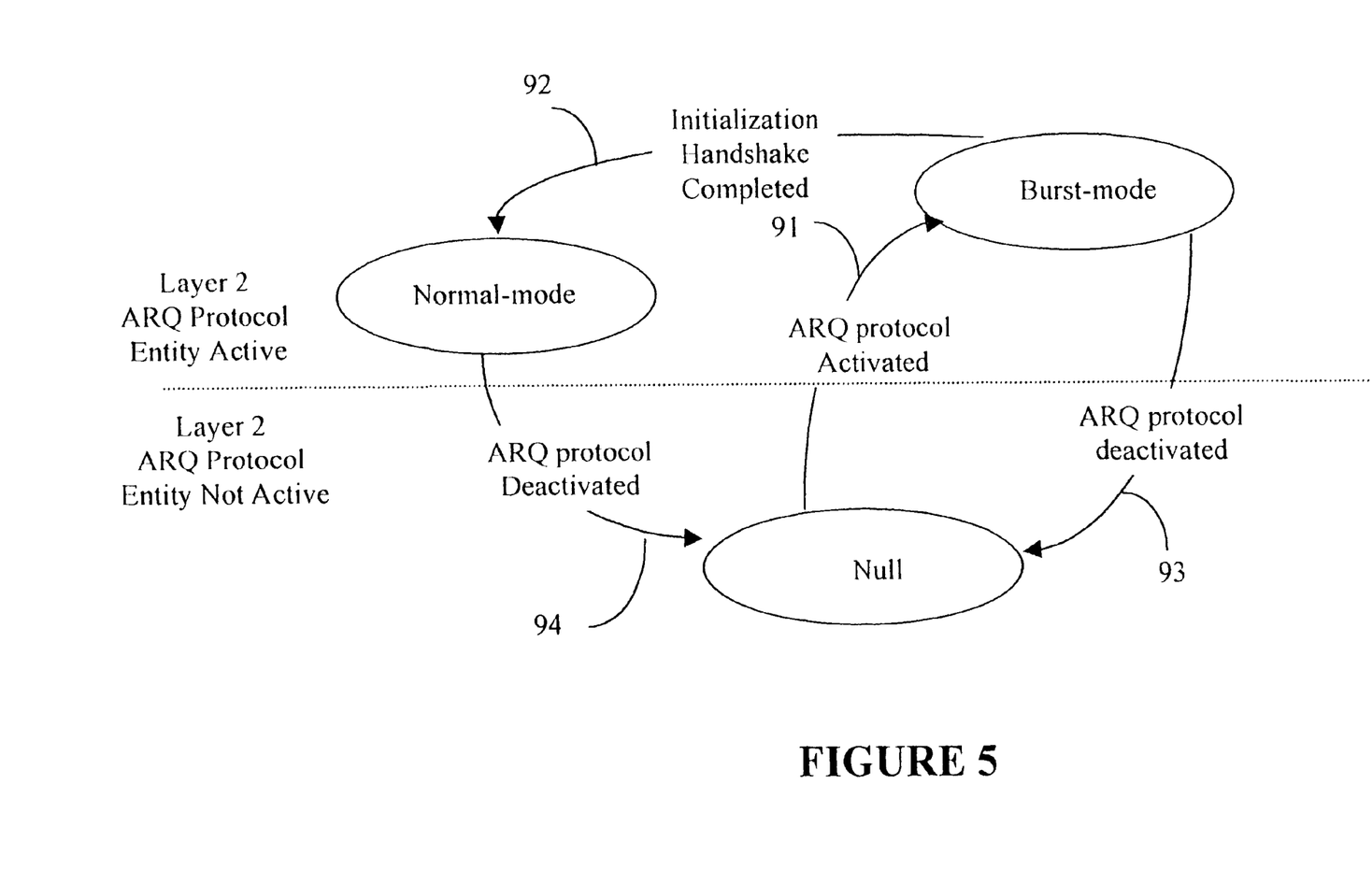
FIG. 5 illustrates the mode of operation of an improved dual mode Layer 2 ARQ protocol.

As shown in FIG. 5, a RLP entity is operating in one of the two modes, i.e., normal-mode and burst-mode. When the RLP entity is first activated, it transits from the NULL state to a default mode which is the burst-mode as shown at 91, where no initialization handshake is required. It should be noted that RLP protocols are provided in pairs, one at each end of the communication link.

The RLP protocol transits to the normal-mode as shown at 92, when certain implementation specific conditions are met. one example of such conditions is when the pending data size is greater than a specific threshold. It is to be understood that other conditions for transition from burst-mode to normal-mode may be imposed, according to the respective CoS.

Whenever the RLP protocol entity at one end decides to transit to the normal-mode, it starts an initialization handshake procedure. Once the handshake procedure is completed, peer RLP protocol entities (the paired RLPs) enter in the normal-mode of operation. Therefore, the transition is automatically synchronized between peer RLP protocol entities.

During the initialization handshake process, burst-mode operation is not allowed. For unacknowledged data burst sent out prior to the initialization handshake process, the RLP protocol entity resends the data burst after entering the normal-mode. Any data burst received during the initialization handshake process is discarded by the ARQ protocol entity.

Once in the normal-mode, the RLP protocol entity is not allowed to transit back to the burst-mode, since the peer protocol entity at the other end of the communication link is already synchronized.

When the RLP instance is released due to the MAC state machine transition to "dormant state", the RLP protocol is deactivated from both modes as shown at 93 and 94.

We should also note that other ARQ methods may be used in the QoS data plane as defined by the present invention for optimizing the operation of the QoS data planes.

The PLDCF section contains the MUX&QOS module 34 which multiplexes various CoS RLP frames onto different physical channels. Based on their QoS requirements, MUX&QoS 34 transmits multiple service type frames to the Physical Layer 20 (not shown) for Coding and Modulation (C&M).

The above description was made for the forward direction of transmission, i.e. from the transmitting side to the receiving side. It is to be understood that the operations are similar for the reverse direction.

At the receiving side, peer SAR modules (not shown) perform reassembly of the multiple Class of Service (CoS) frames received from a peer dedicated/common router (DCR) module (not shown).

Numerous modifications, variations, and adaptations may be made to the particular embodiments of the invention described above without departing from the scope of the invention defined in its claims.

The embodiment of the invention in which an exclusive property or privilege is claimed are defined as follows:

1. A Data Link Control (DLC) protocol for direct support of a network layer protocol, comprising:

at a transmit end of a wireless communication system:

a plurality of Quality of Service (QoS) data planes, a QoS data plane for processing a QoS oriented data packet according to a class of service (CoS), and to provide a radio link protocol data unit (RLP PDU);

a QoS processing module for receiving a network layer protocol data packet, converting said network layer protocol data packet into said QoS oriented data packet, and directing said QoS oriented data packet to one of said QoS data planes according to QoS information in said network layer protocol data packet; and an interface between said DLC and a physical layer for receiving said RLP PDU and transmitting same to said physical layer.

2. A DLC protocol as claimed in claim 1, wherein said network layer protocol is Internet Protocol (IP).

3. A DLC protocol as claimed in claim 1, wherein each said QoS data plane comprises:

a Link Access Control (LAC) protocol instance for receiving said QoS oriented data packet and generating a HDLC-like LAC frame; and a Medium Access Control (MAC) protocol instance for receiving said LAC frame and generating said RLP PDU.

4. A DLC protocol as claimed in claim 3, wherein said LAC protocol instance comprises:

a segmentation and re-assembly (SAR) module for receiving said service oriented data packet and dividing same into a number of sequence frames; and a framing and automatic repeat request (ARQ) module for receiving said sequence frames and encapsulating a plurality of said sequence frames into said LAC frame.

5. A DLC protocol as claimed in claim 3, wherein said MAC protocol instance comprises:

a dedicated/common router (DCR) for receiving and routing said LAC frames to be carried over a radio traffic channel; and a radio link protocol (RLP) for receiving said LAC frames and converting said LAC frames into said RLP PDUs.

6. A DLC protocol as claimed in claim 5, further comprising a MAC control state machine (CSM) for regulating the delivery of said LAC frames to said RLP.

7. A DLC protocol as claimed in claim 5, wherein said RLP comprises an automatic repeat request (ARQ) function for automatic retransmission of said RLP PDUs if received in error at a receiving end of said wireless system.

8. A DLC protocol as claimed in claim 7, wherein said ARQ function has a selective repeat component active during a normal-mode (NM) of operation and a stop and wait (SW) component active during a burst-mode (BM) of operation.

9. A DLC protocol as claimed in claim 4, wherein said LAC frame has a variable size, said size being dynamically optimized based on the conditions of the communication link.

10. A DLC protocol as claimed in claim 9, wherein said size of said LAC frame is automatically reduced when a predetermined number of negative acknowledgments (NAK) are received.

11. A method as claimed in claim 9, wherein said size of said LAC frame is automatically reduced if no acknowledgments are received for a predetermined period of time.

12. A DLC protocol as claimed in claim 1 wherein said interface is a multiplexer for receiving said RLP PDU, and multiplexing same into a physical channel according to the QoS of said RLP PDU, for transmission to a receiving end of said wireless system.

13. A DLC protocol as claimed in claim 1 further comprising a resource control unit for mapping a QoS requirement to a DLC class of service (CoS), and separating said CoS inside the DLC protocol into said QoS data planes.

14. A method for direct processing a network layer protocol data packets for transmission over a wireless communication system, comprising the steps of:

separating the data link layer of the wireless communication system into a plurality of Quality of Service (QoS) data planes, a QoS plane for processing a QoS oriented data packet according to a class of service (CoS), and to provide a radio link protocol data unit (RLP PDU);

processing said network layer protocol data packet by converting said network layer protocol data packet into said QoS oriented data packet and directing said QoS oriented data packet to one of said QoS data planes according to QoS information in said network layer protocol data packet; and forwarding said RLP PDU to a physical layer according to the QoS of said RLP PDU.

15. A method as claimed in claim 14, wherein said network layer protocol is Internet Protocol (IP).

16. A method as claimed in claim 14, wherein said step of separating comprises:

providing a plurality of QoS oriented Link Access Control (LAC) protocol instances, a LAC protocol instance for each said QoS data plane, said LAC protocol instance for receiving said service oriented data packet and generating a HDLC-like LAC frame; and providing a plurality of QoS oriented Medium Access Control (MAC) protocol instances, a MAC protocol instance for each QoS data plane, said MAC protocol instance for receiving said LAC frames and generating said radio link protocol data unit (RLP PDU).

17. A method as claimed in claim 16, wherein said step of generating a HDLC-like LAC frame comprises dividing said QoS oriented data packet into a number of sequence frames and encapsulating a plurality of said sequence frames into said LAC frame.

18. A method as claimed in claim 16, wherein said step of generating said RLP PDU comprises receiving said LAC frames and converting said LAC frames into said RLP PDUs.

19. A method as claimed in claim 18, further comprising regulating the delivery of said LAC frames to said RLP.

20. A method as claimed in claim 16, further comprising an automatic repeat request (ARQ) function for automatic retransmission of said RLP PDUs if received in error at a receiving end of said wireless system.

21. A DLC protocol as claimed in claim 20, wherein said ARQ function operates in a normal-mode (NM) of operation to selectively repeat (SR) any said RLP PDU received in error, and in a burst-mode (BM) of operation to stop and wait (SW) for an acknowledgment of receipt of said RLP PDU.

22. A method as claimed in claim 21, wherein said ARQ function assumes said BM of operation at activation, without any handshake initiation procedures.

23. A method as claimed in claim 21, wherein said ARQ function transits from said BM of operation to said NM of operation whenever an implementation specific condition is met.

24. A method as claimed in claim 23, wherein implementation specific condition is the size of said RLP PDUs.

25. A method as claimed in claim 23, further comprising a handshake initiation sequence for commencing transmission in said NM of operation.

26. A method as claimed in claim 17, wherein said step of encapsulating also provides a dynamic optimization of the size of said LAC frame based on the conditions of the communication link, for enhancing the quality of the air transmission.

27. A method as claimed in claim 26, wherein said size of said LAC frames is automatically reduced when a predetermined number of negative acknowledgments (NAK) are received.

28. A method as claimed in claim 26, wherein said size of said LAC frames is automatically reduced if no acknowledgments are received for a predetermined period of time.

29. A method as claimed in claim 17, wherein said sequence frame comprises a beginning of frame field and a sequence number field.

30. A method as claimed in claim 14, wherein said step of processing comprises mapping a QoS requirement to a DLC class of service (CoS), and separating said CoS inside the DLC protocol into said QoS data planes.

31. A method as claimed in claim 30, wherein said step of processing further comprises adding a length indicator to said network layer protocol data packet.

* * * * *